US006175559B1

United States Patent
Brown

(10) Patent No.: US 6,175,559 B1
(45) Date of Patent: Jan. 16, 2001

(54) METHOD FOR GENERATING PREAMBLE SEQUENCES IN A CODE DIVISION MULTIPLE ACCESS SYSTEM

(75) Inventor: Tyler Brown, Mundelein, IL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/348,571

(22) Filed: Jul. 7, 1999

(51) Int. Cl.[7] .................................................. H04J 13/00
(52) U.S. Cl. ............................................. 370/335; 370/208
(58) Field of Search ..................................... 370/320, 335, 370/342, 479, 393, 441, 208, 203; 375/140, 141, 146, 147

(56) References Cited

U.S. PATENT DOCUMENTS

| 5,260,976 | * 11/1993 | Dolivo et al. ........................... 375/94 |
| 5,457,704 | * 10/1995 | Hoeher et al. ......................... 371/43 |
| 5,790,537 | * 8/1998 | Yoon et al. ........................... 370/342 |

* cited by examiner

Primary Examiner—Douglas W. Olms
Assistant Examiner—Ken Vanderpuye
(74) Attorney, Agent, or Firm—Kenneth A. Haas

(57) ABSTRACT

The present invention provides a method for generating preamble sequences in a code division multiple access system. The method includes forming an outer code in a mobile station. The mobile station forms an inner code. The mobile station multiplies the outer code to the inner code to generate the preamble sequence.

8 Claims, 3 Drawing Sheets

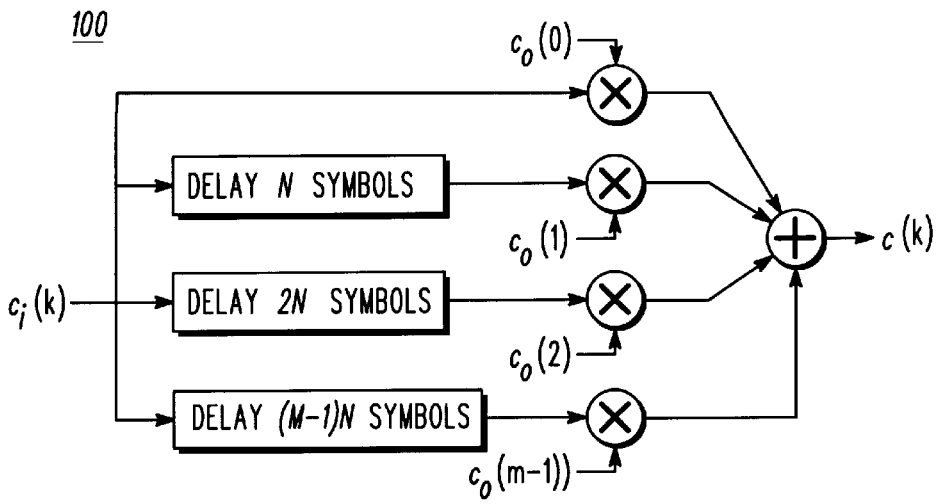
FIG. 1 —PRIOR ART—
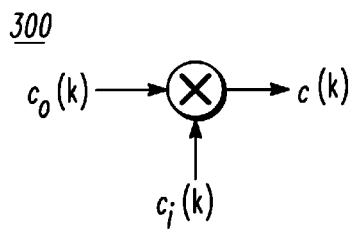
FIG. 3
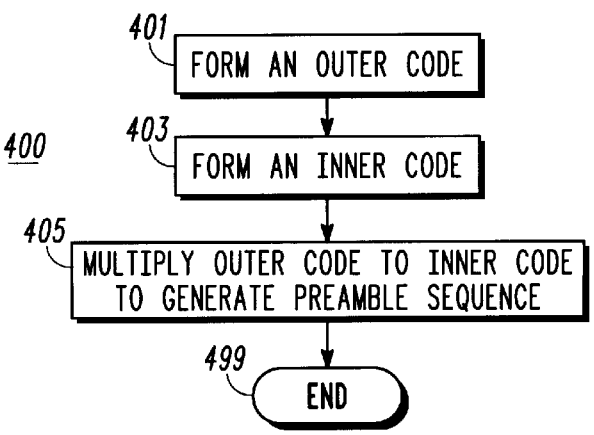
FIG. 4

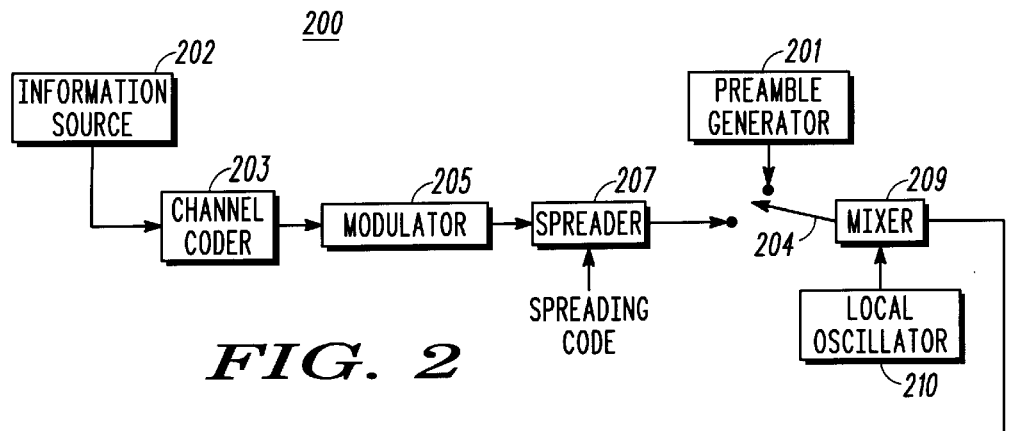
FIG. 2
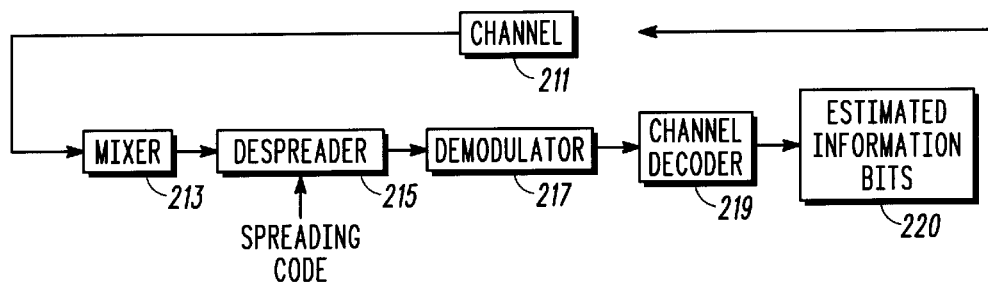
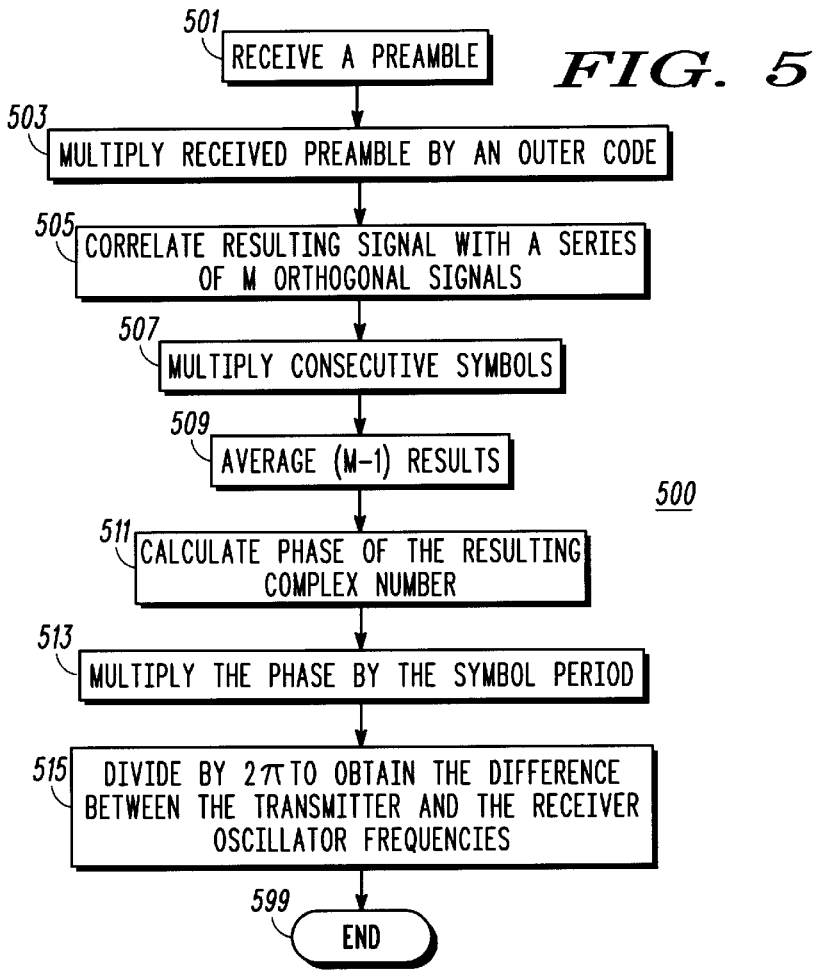
FIG. 5

ONE EMBODIMENT OF THE INVENTION WITH K=8, N=48, M=6, L=4

METHOD FOR GENERATING PREAMBLE SEQUENCES IN A CODE DIVISION MULTIPLE ACCESS SYSTEM

FIELD OF THE INVENTION

The present invention relates generally to communication systems, and more particularly to a method for generating preamble sequences in a communication system.

BACKGROUND OF THE INVENTION

Access channels in Code Division Multiple Access (CDMA) systems typically include the transmission of a short signal known to the base station before the transmission of the information. This allows the base station to detect the presence of a user who has data to transmit. Because multiple mobile stations may be trying to access this channel simultaneously, each user must use a different code. These codes must be designed such that the correlator needed in the base station must be of relatively low complexity. The codes must also be robust to large differences between the carrier frequency of the received signal and the base station's receiver oscillator. They should also lend themselves to simple implementation of automatic frequency control circuits.

In the transmitter of a typical spread spectrum communication system, a source of information bits is first channel coded and then used to modulate a signal which has a bandwidth on the order of the information rate. Coherent, noncoherent, or differential modulation may be used. This signal is then spread to a wider bandwidth by multiplication with a spreading code. The signal is then translated in frequency to a carrier frequency determined by the frequency of a local oscillator and transmitted through an antenna. The signal goes through a channel where it may be modified by additive noise, changes in amplitude and phase as occurs in multipath fading, and changes in carrier frequency as when the transmitter is in motion relative to the receiver. The output of the channel is mixed to baseband with a receiver oscillator whose frequency is known by some means to be close to that of the transmitter oscillator. It is then fed to a receiver which, by some means, knows the arrival time of this signal. The receiver first despreads the incoming signal by multiplication with the same spreading code used in transmission. The signal is then demodulated and finally decoded to yield estimates of the transmitted information bits.

The processes of determining the arrival time and carrier frequency of the received signal are called time and frequency acquisition respectively. One method of performing time and frequency acquisition involves the transmission of a short training signal prior to the transmission of the information-bearing signal. There may be a period of time between the preamble and the transmission of information. This preamble also serves a second purpose in systems where the receiver does not know when a transmission will begin. In some systems, such as IS-95C and WCDMA systems, there may be a number of transmitters which periodically begin transmissions. By looking for the presence of the preamble, the receiver can determine if a transmission is about to begin and if so from which transmitter to expect further transmission.

The signal generated by the preamble generator should be easily detectable by the receiver, allow the receiver to determine the timing of the transmission with high precision and accuracy, allow the receiver to determine the carrier frequency of the received signal with high accuracy and precision, and allow the receiver to determine which transmitter is about to begin transmission.

A prior art preamble generator which generates binary signals of +1 and −1s is shown in FIG. 1. The generator consists of two orthogonal Gold code generators. The inner code, $c_i(n)$, comprises 256 chips that are modulated by 16 symbols, $c_o(m)$, corresponding to one transmitter's code, $c_o$. The total code is therefore:

$$c(k) = \sum_{m=0}^{M-1} c_i(k - mN) c_o(m)$$

The inner code is typically common to all transmitters. The preamble output from this generator suffers from several problems. First, the autocorrelation function has large peaks at multiples of 256 chips, which makes the accuracy of the estimated arrival time of the transmission poor. Second, small differences between transmit and receive oscillator frequencies cause the receiver to misidentify which transmitter is sending the preamble.

Consequently, a need exists for a method for generating preamble sequences in a spread spectrum communication system. Further, a need exists for a method for estimating the difference between the carrier frequency of the received signal and the receiver oscillator frequencies.

BRIEF DESCRIPTION OF THE DRAWINGS

FIG. 1 depicts a preamble generator in accordance with the prior art;

FIG. 2 depicts a spread-spectrum communication system including a preamble generator in accordance with the preferred embodiment of the present invention;

FIG. 3 depicts a preamble generator in accordance with the preferred embodiment of the present invention;

FIG. 4 depicts a flow chart depicting the preferred method for generating preamble sequences in accordance with the preferred embodiment of the present invention;

FIG. 5 depicts a flow chart depicting the preferred method for estimating the difference between the carrier frequency of the received signal and the receiver oscillator frequency in accordance with the preferred embodiment of the present invention.

DETAILED DESCRIPTION OF A PREFERRED EMBODIMENT

Figure 6:
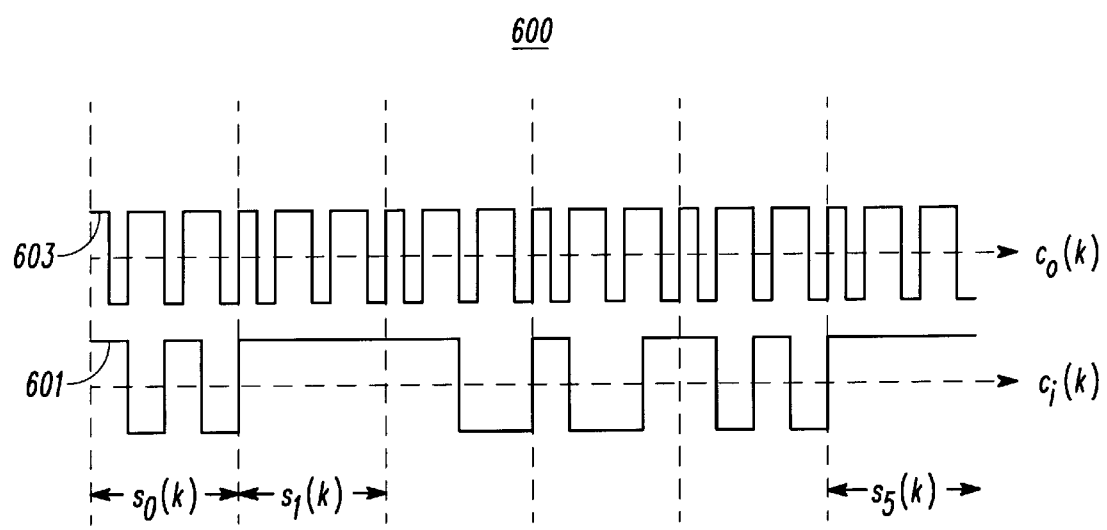
FIG. 6 depicts the inner and outer codes in accordance with the preferred embodiment of the present invention.

The present invention provides a method for generating preamble sequences in a CDMA communication system. The method comprises forming an outer code and an inner code at a mobile station. The mobile station then multiplies the outer code by the inner code to generate a preamble sequence.

The present invention can be better understood with reference to FIGS. 2–6. FIG. 2 illustrates a spread-spectrum communication system 200 including a preamble generator 201 in accordance with the preferred embodiment of the present invention. In the preferred embodiment of the present invention, communication system 200 utilizes a Code Division Multiple Access (CDMA) system protocol. One such protocol is described in "Personal Station-Base Station Compatibility Requirements for 1.8 to 2.0 GHz Code Division Multiple Access (CDMA) Personal Communication Systems" (American National Standards Institute (ANSI) J-STD-008). In alternate embodiments, communication system 200 may utilize other digital spread spectrum cellular communication system protocols such as, but not limited to, developing 3G standards such as the CDMA2000 vision and Wideband CDMA for UMTS.

Communication system 200 includes an information source 202 that provides a digital signal. The digital signal is input to channel coder 203, which performs channel coding on the information as well known in the art. The output from channel coder 203 is sent to modulator 205, which modulates the information as is well-known in the art. The modulated data is then sent to spreader 207, which spreader the modulated information utilizing a spreading code.

Mixer 209 receives a signal from either preamble generator 201 or spreader 207. This is controlled by switch 204. Mixer 209 mixes the information utilizing a local oscillator 210, and sends the mixed signal over the air from a transmitter to a receiver via antenna channel 211.

Channel 211 sends the signal to mixer 213. Mixer 213 mixes the signal, and sends the mixed signal to despreader 215. Despreader 215 despreads the signal utilizing the same spreading code used to spread the signal. The despread signal is then sent to a demodulator 217, which demodulates the signal. The demodulated signal is then sent to channel decoder 219, which decodes the signal to generate information bits 220.

A preamble generator 201 in accordance with the preferred embodiment of the present invention is shown in FIG. 3. Preamble generator 201 preferably includes two codes. Both codes are preferably of length N chips, where N is the total number of symbols in the preamble. The preamble chips c(k) are given by $$c(k) = c_i(k) \cdot c_o(k)$$

By choosing $c_i(k)$ and $c_o(k)$ appropriately, the deficiencies with the prior art scheme can be removed.

As an example of the preferred embodiment, FIG. 6 depicts inner code 601 $c_i(k)$ and the outer code 603 $c_o(k)$. In the preferred embodiment as depicted in FIG. 6, outer code 603 is periodic with period K chips and is preferably formed from sections of a maximal-length sequence, but is alternately a Gold or Kasami sequence. Outer code 603 is preferably common for all transmitters. Inner code 601, which is preferably different for different transmitters, preferably comprises a series of M orthogonal codewords of length P:

$$c_i(k) = \sum_{j=0}^{M-1} s^j(k - jP)$$

where $s^j$, j=0,1, . . . ,M−1, is a set of orthogonal codewords. It is not-required that the orthogonal codewords are unique. If the total number of transmitters that transmit to the receiver is L, then their L inner codes $c_i^l(k)$, preferably comprises a series of orthogonal codewords:

$$c_i^l(k) = \sum_{j=0}^{M-1} s_1^j(k - jP) \quad l = 1, 2, \ldots, L-1$$

These codewords are preferably taken from a set of Hadamard codewords of length P. Hadamard codewords are described in "Principles of Communication Systems" by Taub and Schilling, pubblished in 1986 by McGraw Hill, herein incorporated by reference. In an alternate embodiment of the present invention, the code words are taken from a set of orthogonal Gold codes of length P. The codewords may also be derived from a set of orthogonal codewords by upsampling. If w is a codeword of length $P_1$ from a set of orthogonal codewords, then the codeword, s, which has length P equal to a multiple of $P_1$ can be formed by duplicating elements of w:

$$s_l\left(k\frac{P}{P_1} + n\right) = w(k), \quad n = 0, 1, \ldots, \frac{P}{P_1} - 1, k = 0, 1, \ldots, P_1 - 1$$

The preamble generator of the present invention can be implemented in custom hardware, programmable hardware, or software in a microprocessor.

It is not necessary for the vectors $s_1$ to be orthogonal, vectors which have low crosscorrelation can also be used. The invention can also employ quadrature codes instead of codes which only take on values of +/−1.

FIG. 4 depicts a flow chart 400 depicting the preferred method for generating preamble sequences in accordance with the preferred embodiment of the present invention. Flow chart 400 is preferably done at a mobile station. The mobile station forms (401) an outer code, as described with respect to FIG. 6 above. The mobile station then forms (403) an inner code, as described above with respect to FIG. 6. The mobile station then multiplies (405) the outer code by the inner code to generate a preamble sequence. The process then ends (499).

FIG. 5 depicts a flow chart 500 depicting the preferred method for estimating the difference between the carrier frequency of the received signal and the receiver oscillator frequency in accordance with the preferred embodiment of the present invention. Flow chart 500 is preferably done at a base station. The base station receives (501) a preamble from a mobile station. The mobile station multiplies (503) the received preamble by an outer code matching the outer code used by the base station. The base station then correlates (505) the resulting signal with a series of M orthogonal signals to obtain a series of M correlated output symbols.

The base station then multiplies (507) consecutive correlated output symbols with the first symbol in each pair being complex conjugated. The base station averages (509) (M−1) results. The base station then calculates (511) the phase of the resulting complex number. The mobile station then multiplies (513) the phase by the symbol period.

The base station then divides (515) by ($2\pi$) to obtain the difference between the transmitter and the receiver oscillator frequencies. The process then ends (599).

Thus, the present invention provides a means of generating preamble sequences that can be detected by a base station with simple circuitry. In addition, when the transmitter and receiver oscillator frequencies are not exactly equal, the preamble received at the base station appears very different from, or highly uncorrelated with, the other preambles in the set. The preambles also allow the difference between the transmitter and receiver oscillator frequencies to be calculated in a straightforward manner at the base station.

While this invention has been described in terms of certain examples thereof, it is not intended that it be limited to the above description, but rather only to the extent set forth in the claims that follow.

I claim:

1. A method for generating preamble sequences in a CDMA system, the method comprising the steps of:

forming an outer code in a mobile station, wherein the outer code is formed from a generator from the group consisting of a maximum length sequence generator, a Kasami sequence generator, and a Gold sequence generator;

forming an inner code in the mobile station; and multiplying the outer code by the inner code to generate a preamble sequence.

2. A method for generating preamble sequences in a CDMA system in accordance with claim 1, wherein the period of the outer code comprises k symbols, wherein k is a positive integer.

3. A method for generating preamble sequences in a CDMA system in accordance with claim 1, wherein the inner codes are formed as a series of M orthogonal code words having a length P, wherein M and P are positive integers.

4. A method for generating preamble sequences in a CDMA system in accordance with claim 1, wherein the inner codes comprise a set of Hadamard code words.

5. A method for generating preamble sequences in a CDMA system, the method comprising the steps of:

forming an outer code in a mobile station;

forming an inner code in the mobile station utilizing the following equation:

$$c_i(k) = \sum_{j=0}^{M-1} s_j(k - jP)$$

where $s_j$, j=0,1, . . . ,M−1 are a set of orthogonal codewords of length P, where M and P are positive integers; and multiplying the outer code by the inner code to generate a preamble sequence.

6. A method for generating preamble sequences in a CDMA system, the method comprising the steps of:

forming an outer code in a mobile station, the outer code comprising a 3840 symbol segment of an m-sequence of length 33554431;

forming an inner code in the mobile station, the inner code being of the form:

$$c_i(k) = \sum_{j=0}^{M-1} w_j(k - jP)$$

where $w_j$, j=0,1, . . . ,M−1 are a set of Hadamard codewords of length 16, M=256, and P=16.

7. A method for estimating the difference between the carrier frequency of the received signal and the receiver oscillator frequencies comprising:

multiplying a received preamble by an outer code;

correlating the resulting signal with the series of M orthogonal signals;

multiplying consecutive symbols with the first symbol of each pair being complex conjugated;

averaging (M−1) results;

calculating the phase of the resulting complex number;

multiplying the phase by the symbol period; and dividing by ($2\pi$) to get the difference between the carrier frequency of the received signal and the receiver oscillator frequency.

8. A method for generating preamble sequences in a CDMA system, the method comprising the steps of:

forming an outer code in a mobile station, the outer code comprising a 3840 symbol segment of a Gold-sequence of length 33554431;

forming an inner code in the mobile station, the inner code being of the form:

$$c_i(k) = \sum_{j=0}^{M-1} w_j(k - jP)$$

where $w_j$, j=0,1, . . . ,M−1 are a set of Hadamard codewords of length 16, M=256, and P=16.

* * * * *